United States Patent [19]

Chern

[11] Patent Number: 5,054,465

[45] Date of Patent: Oct. 8, 1991

[54] FOOD UTENSIL

[75] Inventor: Ching-Shyang Chern, Tainan, Taiwan

[73] Assignee: Ying Hung Enterprise Co., Ltd., Tainan, Taiwan

[21] Appl. No.: 591,763

[22] Filed: Oct. 2, 1990

[51] Int. Cl.⁵ ............................................. F24C 3/00
[52] U.S. Cl. .............................. 126/39 R; 126/39 BA; 219/462; 219/458; 219/443
[58] Field of Search ............... 126/39 BA, 39 H, 39 J, 126/275 E, 148, 214 C, 220, 39 R; 219/443, 447, 456, 457, 458, 459, 462

[56] References Cited

U.S. PATENT DOCUMENTS

| | | | |
|---|---|---|---|
| 2,010,931 | 8/1935 | Sargent | 126/214 C |
| 2,601,011 | 6/1952 | Wilcox | 126/214 C |
| 2,861,563 | 11/1958 | Jensen | 126/220 X |
| 4,154,218 | 5/1979 | Hulet | 126/214 C X |

Primary Examiner—Larry Jones
Attorney, Agent, or Firm—Morton J. Rosenberg; David I. Klein

[57] ABSTRACT

A food utensil for use with either an electric heater or a gas burner is provided having an upwardly projecting flat annular section surrounding a central opening. Six semi-circular sections extending radially from the central opening passes around the annular section. A pot may be mounted over the central opening for heat transfer directly from the electric heater or the gas burner and food contained in the semi-circular sections may be heated simultaneously with the cooking of food in the pot. In this manner, food products may be heated that are contained within the pot or pan mounted on the food utensil while simultaneously allowing cooking of food contained within the semi-circular sections.

2 Claims, 4 Drawing Sheets

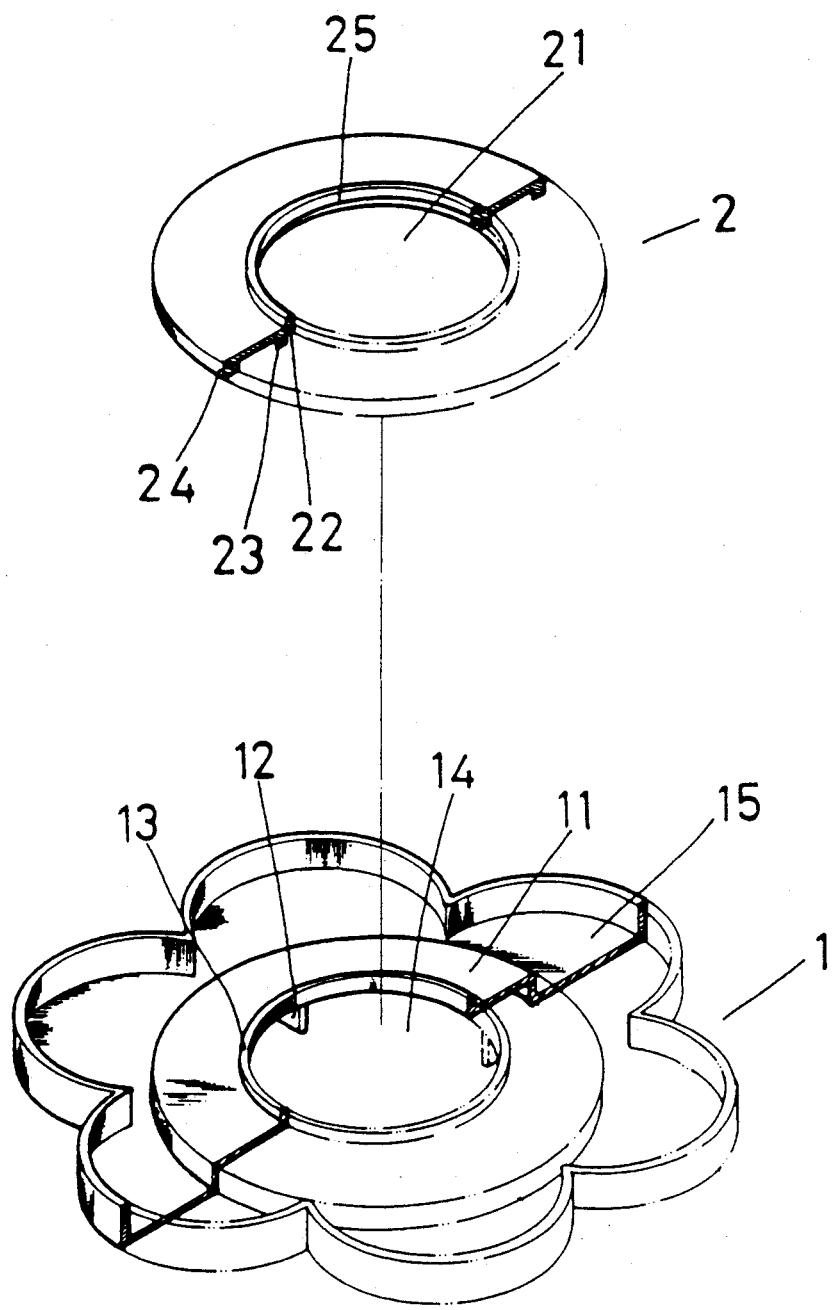
F I G. 3

FOOD UTENSIL

BACKGROUND OF THE INVENTION

This invention relates to a food utensil or pot sitter to receive a pot or pan placed thereon and to be mounted on an electric heater or a gas over for cooking food.

SUMMARY OF THE INVENTION

One object of this invention is to provide a food utensil to be mounted on an electric heater to cook food either directly placed on a flat annular section and/or six semi-circular sections around the annular section or indirectly placed in a pot or pan to be mounted on the food utensil.

Another object of this invention is to supply a food utensil to be mounted on a gas oven to cook food either directly placed on a flat annular section and/or six semi-circular sections abutting around the annular section or indirectly placed in a pot or pan to be mounted on the food utensil.

The food utensil of this invention is provided with a central opening, an upwardly projecting flat annular section surrounding the central opening and six semi-circular sections extending laterally around the annular section in similar design contour to a flower having six petals.

The flat annular section has an upwardly projecting ring formed on an inner edge surrounding the central openings for a pot or pan to be mounted thereon. Food such as meat, fish, or other food to be heated may be placed on the annular section for frying or baking.

The six semi-circular sections have a continuous upright fence or flange of appropriate height formed at the outer semi-circular edge and food such as meat, fish or other food to be heated may be directly placed thereon for frying or baking.

When the food utensil is used in connection with a gas oven it is additionally provided with a plurality of feet under the annular section and an independent annular plate to be placed on the annular section. In this manner, the food utensil may be used for cooking food by heat produced by a gas oven in the same manner as may be attained by an electric heater.

BRIEF DESCRIPTION OF THE DRAWINGS

FIG. 3 is an exploded perspective view of a second embodiment of the food utensil used in connection with a gas oven; and, FIG. 4 is a cross-sectional view of the second embodiment of the food utensil mounted on a gas oven.

DESCRIPTION OF THE PREFERRED EMBODIMENTS

Figure 1:
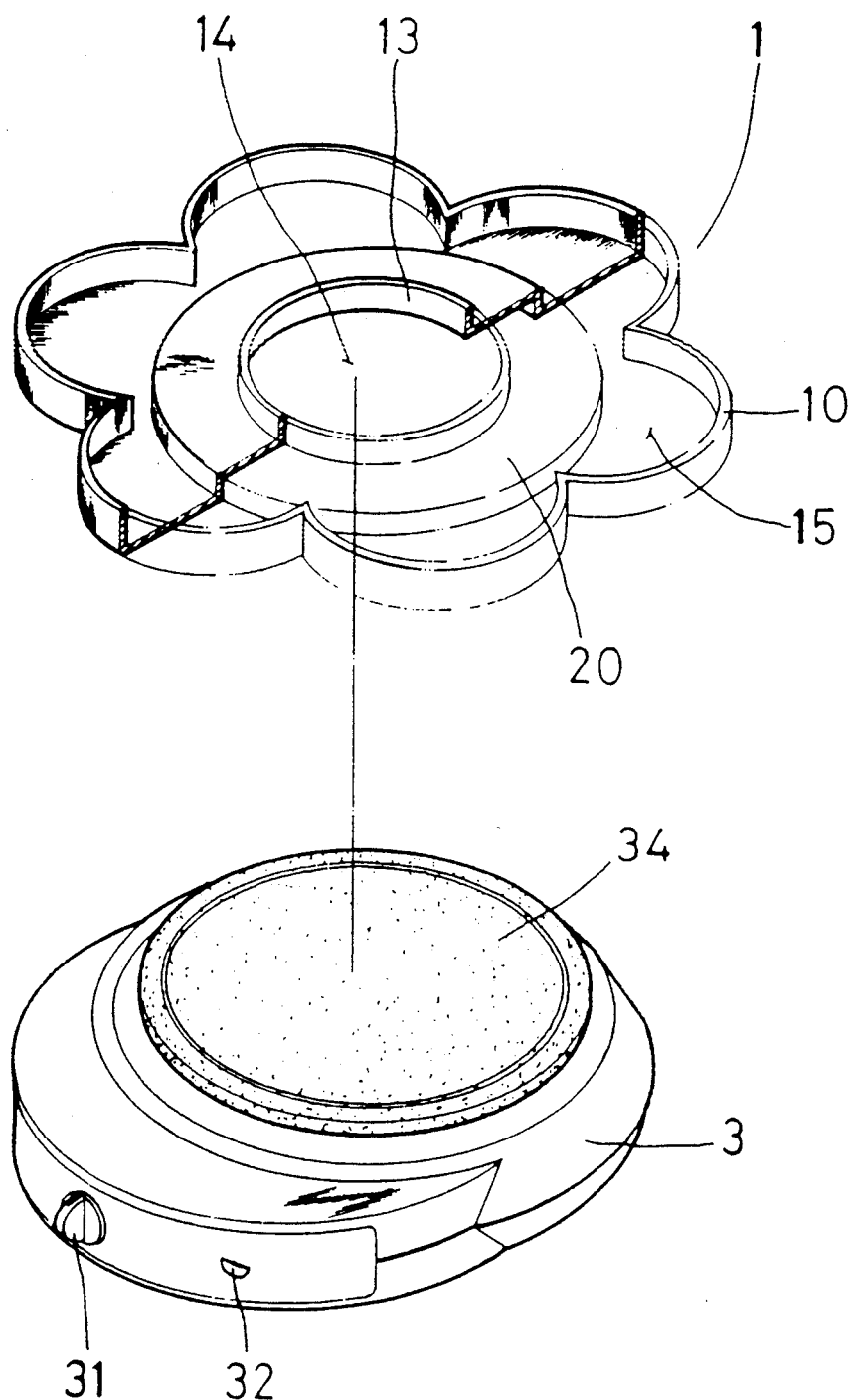
FIG. 1 is an exploded perspective view of a first embodiment of the food utensil used in connection with an electric heater.
Figure 2:
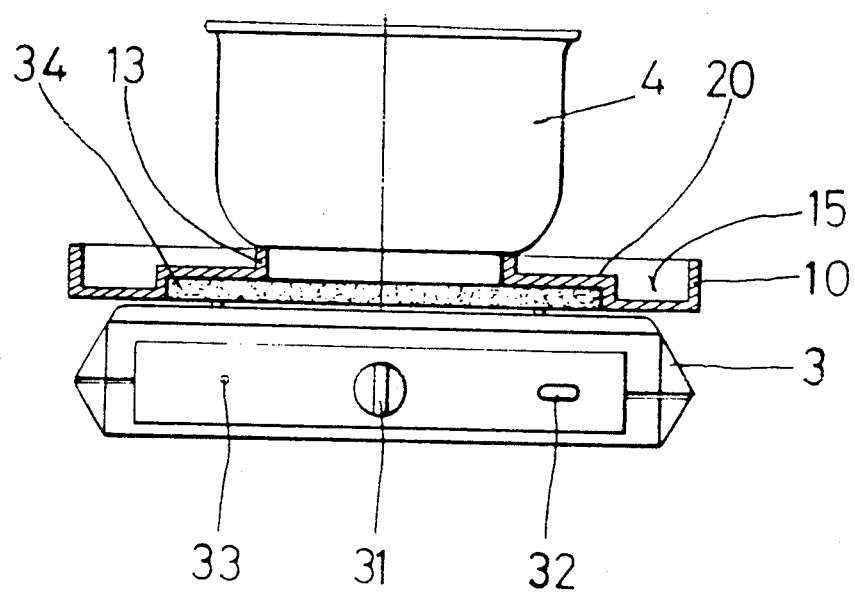
FIG. 2 is a cross-sectional view of the first embodiment of the food utensil mounted on an electric heater.
Figure 4:
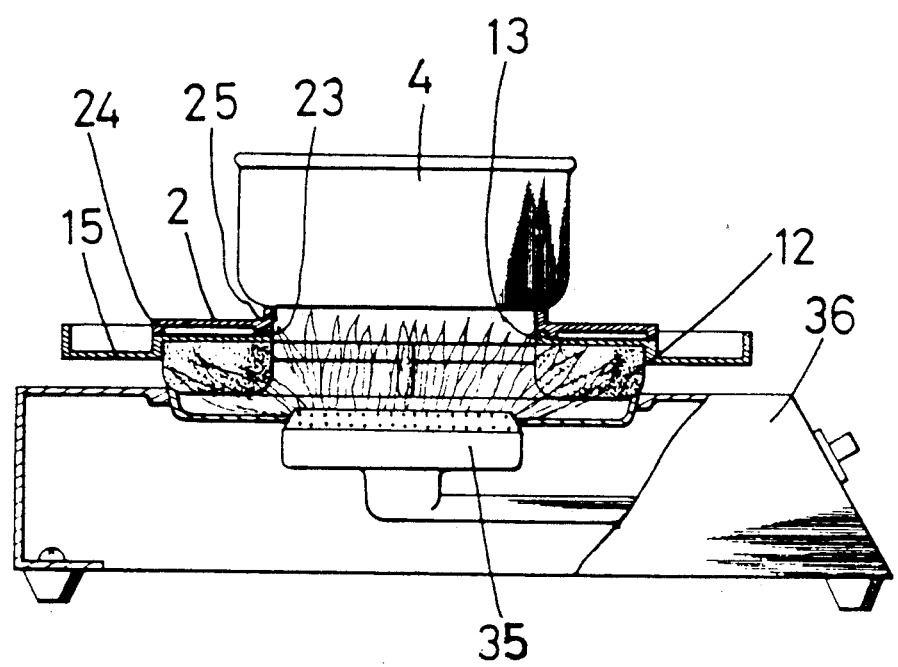

Referring now to FIGS. 1 and 2, there is shown the first embodiment of pot sitter or food utensil 1 for use with an electric heater 3. Food utensil 1 for use with a gas burner 35 is shown in FIG. 4.

Referring to FIGS. 1 and 2, food utensil 1 includes pot positioning member of body 10 in the contour form of a flower having six semi-circular petals projecting radially outward. An upwardly projecting flat annular section 20 includes a central opening 14 defined by annular section 20. Projecting ring 13 projects upwardly and surrounds opening 14 at an inner edge of annular section 20. Six semi-circular sections 15 are provided which abut annular section 20 with each of sections 15 respectively having a semi-circular fence or flange of appropriate height at an outside edge to contain food placed in any of sections 15.

Electric heater 3 is of standard construction and as an example is shown circular in contour in the Figures. Flat plate 34 formed on an upper surface may be coated with a layer of Teflon. The interior structure of electric heater 3 is omitted in this description as it is well known in the art, however heater 3 includes a standard on/off switch 31, temperature adjusting knob 32 and a pilot lamp 33 for convenience of use as shown in FIG. 2. In operation, food utensil 1 is placed on heater 3. Projecting flat annular section 20 engages with heating flat plate 34 in contiguous interface in a manner that food utensil 1 is mounted on heater 3 without declining in any direction.

When switch 31 is turned ON, pilot lamp 33 is lighted. Temperature adjusting knob 32 is turned to the needed temperature for a particular food being heated. Heating plate 34 gradually becomes hotter and heat is transmitted to annular section 20 of pot sitter or food utensil 1 which may be used to fry or bake meat, fish or other food products. However, the six semi-circular sections 15 may also be used for frying and baking food, or a pot or pan 4 may be placed on food utensil 1 for boiling or frying food.

Referring to FIGS. 3 and 4, the second embodiment of food utensil 1 is shown applicable to a gas oven 36. The structure of food utensil 1 is substantially the same as that shown in FIGS. 1 and 2 having flat annular section 11 (corresponding to section 20 in the first embodiment). There is provided central opening 14, projecting ring 13, six semi-circular sections 15 having a semi-circular fence or flange of predetermined height at the outside edge and abutting annular section 11. A plurality of vertical feet 12 are equally spaced apart under annular section 11 to interface with a well of gas oven 36. Additionally, independent flat annular plate 2 is provided to be mounted on annular section 11 of food utensil or pot sitter 1 having central opening 21 to communicate with the opening 14 of section 11. Projecting ring 22 receives pot or pan 4 in the manner previously described. An annular groove 25 is formed under the projecting ring 22 to interfacingly mate with projecting ring 13. Two annular projections 23 and 25 are formed on the bottom of flat plate 22. Inner projection 23 abuts groove 25 and outer projection 24 is formed on the outer circumferential edge of annular section 11.

In using the second embodiment shown in FIGS. 3 and 4, the annular plate 2 is placed on food utensil 1 with projecting ring 22 sitting on projecting ring 13 and annular projections 23, 24 sitting on upwardly projecting flat annular section 11. Annular plate 2 is separated from flat annular section 11 so that heat is evenly transmitted to annular plate 2. Food utensil 1 is placed on a gas oven 36 with feet 12 sitting within the well of gas burner 35. Pot or pan 4 is placed on the annular plate for cooking food. Simultaneously, the annular section 11 and the six semi-circular sections 15 may also be used for frying or baking food since sections 11 and 15 also become hot enough to cook the food put thereon.

In general, this invention is considered to have the following advantages:

1. It can be used for various ways for cooking, such as boiling, frying and baking food products;

2. It can be applied to two kinds of energy sources such as electricity and gas whether it is used at home or brought to a campsite for an outdoor activity; and, 3. The food cooked on the annular plate can become well done almost simultaneously with the food in a pot or pan being cooked since there is a hollow space between the annular plate and the food utensil body which makes the even transmission of heat to the annular plate for heating the food placed thereon.

I claim:

1. A food utensil system for an electric heater having a heating plate member for removeably mounting a pot thereon comprising:

a pot positioning member having a central opening, said pot positioning member including a substantially planar and annularly contoured flat annular section, said flat annular section having an upwardly directed projection ring formed on a radial inner surface of said annularly contoured flat annular section for mounting said pot thereon in alignment with said central opening, said pot positioning member including a plurality of substantially semi-circular sections positioned radially external said semi-circular sections defining a plurality of food hearing compartments, having a continuous upwardly directed flange member for maintaining food to be heated within said food heating compartments whereby food may be heated in said pot and said food compartments simultaneously.

2. A food utensil system for a gas burner having a well for removeably mounting a pot thereon comprising:

a pot positioning member having a central opening, said pot positioning member including a first substantially planar and annularly contoured flat annular section having an upwardly directed projection ring member formed on a radial inner surface of said first annularly contoured flat annular section, said pot positioning member including a plurality of substantially semi-circular sections positioned radially external said first flat annular section defining a plurality of food heating compartments, said flat annular section having a plurality of downwardly projecting foot members of interface with said gas burner well, said pot positioning member including a plurality of substantially semi-circular sections positioned radially external said semi-circular sections defining a plurality of food heating compartments having a continuous upwardly directed flange member for maintaining food to be heated whereby food may be heated in said pot and said food compartments simultaneously; and, a second annularly contoured flat annular section having a pair of downwardly directed continuous ring members for respective mounting in interfacing relation with said projection ring member and an outer peripheral edge of said first annular section for providing an enclosed annularly contoured food heating chamber for even transmission of heat.

* * * * *